US009814185B2

(12) United States Patent
Arnould et al.

(10) Patent No.: US 9,814,185 B2
(45) Date of Patent: Nov. 14, 2017

(54) SQUARE BALER

(71) Applicant: USINES CLAAS FRANCE S.A.S., St. Remy/Woippy (FR)

(72) Inventors: Cyrille Arnould, Montoy-Flanville (FR); Marc Altmayer, Alzing (FR)

(73) Assignee: USINES CLAAS FRANCE S.A.S., St. Remy/Woippy (FR)

( * ) Notice: Subject to any disclaimer, the term of this patent is extended or adjusted under 35 U.S.C. 154(b) by 96 days.

(21) Appl. No.: 14/955,335

(22) Filed: Dec. 1, 2015

(65) Prior Publication Data
US 2016/0157434 A1 Jun. 9, 2016

(30) Foreign Application Priority Data
Dec. 3, 2014 (DE) ......................... 10 2014 017 782

(51) Int. Cl.
*A01F 15/14* (2006.01)
(52) U.S. Cl.
CPC .................................. *A01F 15/145* (2013.01)
(58) Field of Classification Search
CPC ........ A01F 15/08; A01F 15/145; A01F 15/14; A01D 59/04; F01P 11/10; A01B 71/08
USPC ........ 100/33 R, 102; 56/12.8, 343, 433, 444, 56/445; 289/2
See application file for complete search history.

(56) References Cited

U.S. PATENT DOCUMENTS

| 3,020,829 A | 2/1962 | Pearson |
| 7,318,376 B1* | 1/2008 | Baldauf ................ A01F 15/145 100/102 |
| 2007/0175611 A1* | 8/2007 | Roth ...................... A01B 71/08 165/95 |
| 2010/0175359 A1* | 7/2010 | Webber ................... A01F 15/14 56/433 |
| 2014/0202346 A1 | 7/2014 | Van Den Wildenberg |

FOREIGN PATENT DOCUMENTS

| DE | 19528658 | 2/1997 |
| EP | 2671444 | 12/2013 |

* cited by examiner

*Primary Examiner* — Jimmy T Nguyen
(74) *Attorney, Agent, or Firm* — Collard & Roe, P.C.

(57) ABSTRACT

A square baler has a press channel, a knotter arranged on the press channel, a blower and flow guide element, which is moveable between a first position, in which the flow guide element directs a blowing air stream of the blower onto the knotter, and at least one second position, in which the flow guide element directs the blowing air stream past the knotter.

12 Claims, 2 Drawing Sheets

SQUARE BALER

CROSS-REFERENCE TO A RELATED APPLICATION

The invention described and claimed hereinbelow is also described in German Patent Application DE 10 2014 017 782.3, filed on Dec. 3, 2014. The German Patent Application, the subject matter of which is incorporated herein by reference, provides the basis for a claim of priority of invention under 35 U.S.C. 119(a)-(d).

BACKGROUND OF THE INVENTION

The present invention relates to a mowing device to be coupled to the rear of a square baler for forming bales from agricultural harvest material. Such a square baler conventionally comprises a press piston which is moveable backwards and forwards in a press channel in order to compact therein harvest material introduced into the press channel, and a knotter for knotting a strand of twine, by which a bale finish-formed in the press channel is held together. The wall of the press channel comprises slots through which the twine is passed. Through these slots, small fragments of the harvest material can escape during the compacting operation and settle outside the press channel, in particular on the knotter, impairing the functionality of the same.

From U.S. Pat. No. 3,020,829, a square baler is known, in which adjacent to a knotter an outlet nozzle of a blower is arranged in order to direct an air stream onto the knotter. Although the deposition of harvest material fragments on the knotter can be slowed down with such an air stream it cannot however be entirely prevented so that the operation of the square baler has to be interrupted from time to time in order to clean the knotter. This impairs the productivity of the baler. It is therefore desirable to be able to make the time intervals between two clean-ups of the knotter as long as possible. Although this is possible to a certain degree by increasing the flow velocity, a powerful blower required for this purpose is expensive and requires a lot of drive energy, which in turn impairs the economy.

SUMMARY OF THE INVENTION

The present invention overcomes the shortcomings of known arts, such as those mentioned above.

The invention provides a square baler configured for operation in which long time intervals between a need for clean-ups of the knotters is realized even with a low blower power.

In one embodiment, the inventive square baler comprises a press channel, a first knotter arranged on the press channel, a blower and a flow guiding element. The flow guiding element is moveable between a first position, in which it directs a blowing air stream of the blower onto the first knotter and at least one second position, in which it directs the blowing air stream past the first knotter. Particles that have settled in the knotter are thus ultimately subjected to the pulling force of the blowing air stream or stationary air. This change promotes movements of the particles which facilitate adhering particles to separate from the knotter again. In this way it is possible even with low blower power to effectively delay the growth of a particle layer on the knotter.

In the second position, the flow guide element practically directs the blowing air stream onto a second knotter. Additionally, further knotters can be arranged so that they are subjected to the blowing air stream in an intermediate position between the first and the second position. Thus, a single blower is sufficient in order to prevent or delay the deposition of particles on multiple knotters.

In order to keep a plurality of knotters arranged in a row clean, the baler comprises at least two flow guide elements, wherein each knotter is assigned exactly one of the flow guide elements for directing the blowing air stream onto the knotter.

As is known, an amount of harvest material particles which escape out of the press channel is variable during the course of a movement cycle of the press piston. The greatest discharge of particles occurs towards the end of a press movement. It is desirable if these particles could be blown away before they have opportunity to settle on a surface of the press, in particular on a knotter. The longer the time span between the discharge of the particles from the press channel and their exposure to the blowing air stream, the more particles settle in the meantime. In order to avoid that this results in a premature contamination of a single knotter, for the sake of which the operation of the square baler would have to be interrupted, even if other knotters are not yet contaminated so severely, the periods of the flow guide element and of the press piston should have a non-integer ratio. Doing so ensures that on each knotter the time span between the maximum of the particle discharge and the exposure of the knotter to the blowing air stream fluctuates and on average is the same for all knotters.

In particular, the movements of the press piston and of the flow guide element can be synchronised with one another so that with the same position of the press piston the flow guide element, in different periods of the piston movement, alternately assumes the first and the second position. This piston position is the one in which the discharge rate of the particles from the press channel is maximal, or directly follow the maximum. In this way, it is ensured that a large part of the particles discharged from the press channel is blown away alternately at the first knotter and at the second knotter before it has time to settle on the knotter concerned.

It is practical, furthermore, to select the periods and the phase position of the movements of press piston and flow guide element so that in each period of the press piston movement the flow guide element covers the distance between first and second position at least once so that first and second knotter in each period of the press piston movement are at least subjected to blowing air once.

The flow guide element can comprise at least one pivotable flap; preferentially, multiple flaps which, coupled, can be pivoted in the same direction, are provided.

The at least one flap is arranged at the outlet of an air guide tube.

The at least one flap is separated from the knotters by an intermediate space that is free of air-conducting installations. Accordingly, the blowing air stream continuously pivots to and fro between first and second knotter and also prevents particle depositions between the knotters.

The pivoting speed of the flap can be lower in the first and second position than in an intermediate position so that the time during which the first and second knotter are subjected to the blowing air stream is extended which in turn counteracts rapid contamination of the first and of the second knotter.

A third knotter can be present which is subjected to the blowing air stream in the intermediate position. The time span during which the third knotter is subjected to the blowing air stream is shorter than with the first and second knotter, but in contrast with these the third knotter however is subjected to the blowing air stream twice in each period of the movement of the flow guide element and in this way, is efficiently kept clean.

Such a speed-variable pivot movement of the flap is driven in a simple manner by an eccentric.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
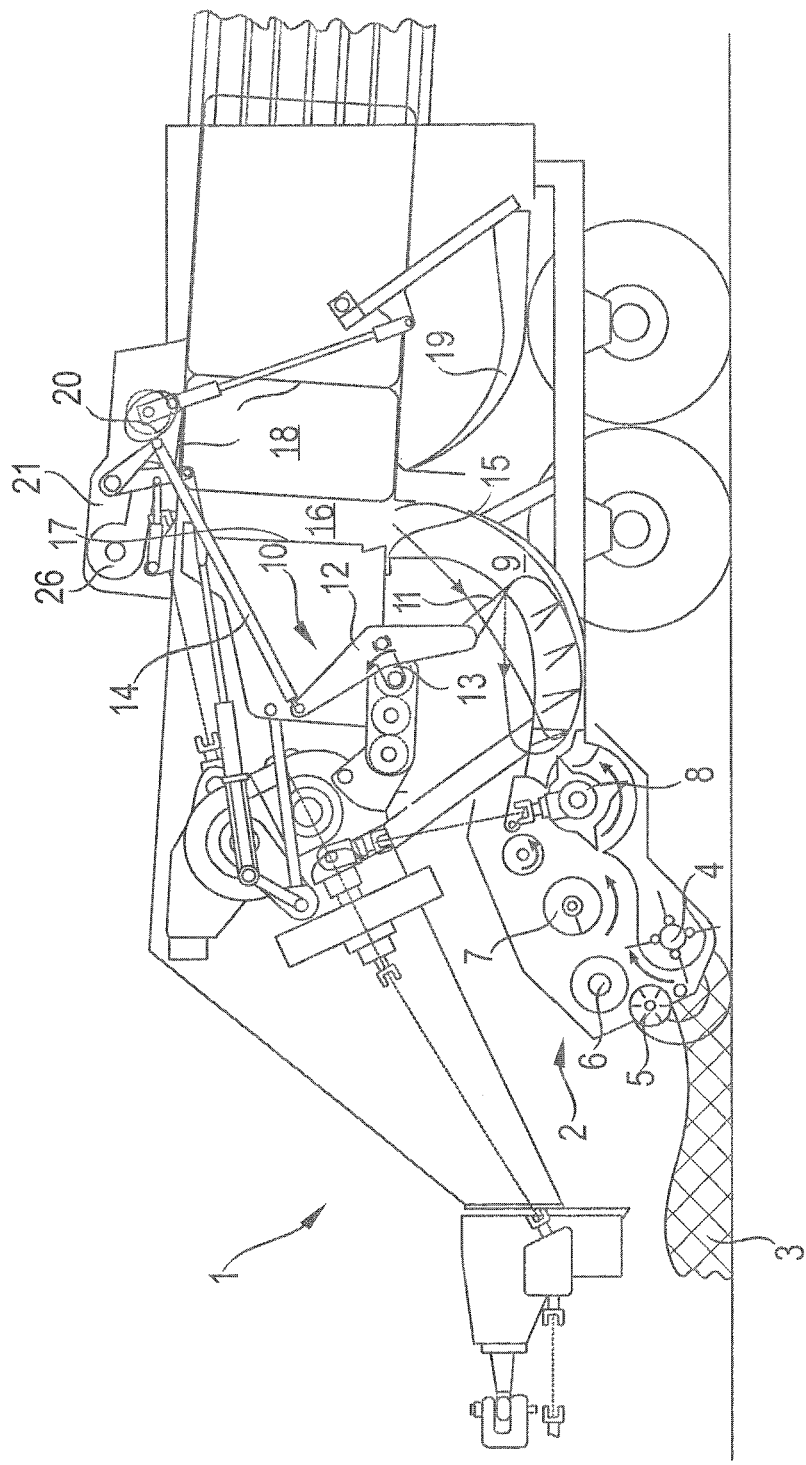
FIG. 1 presents a schematic sectional representation of a baler according to the invention.

The baler 1 shown in FIG. 1 is configured as a trailer for hitching to a towing vehicle which is not shown. The invention, however, is not limited to the baler 1 as shown, but may be implemented as a self-propelled baler without deviating from the inventive principles.

A pickup device 2 of the baler, also called pickup, serves for picking up harvest material 3 from the ground. The pickup device 2 comprises a collecting drum 4 fitted with projecting tines which are rotationally driven in such a direction that it pushes the harvest material 3 on the ground in front of it, lifting it in the process and pulling it into a gap limited by rollers 5, 6 of a hold-down. A screw roller 7 arranged at the end of the gap is fitted with two screws of opposite direction of rotation, which push the harvest material together towards the middle of the baler feeding it to a cutting rotor 8. Knives which are fixed in position engage into intermediate spaces of the cutting rotor 8 in order to cut the harvest material. The cut harvest material is fed to a collecting channel 9 by the rotation of the cutting rotor 8.

The collecting channel 9 is limited towards the top by a convexly curved ceiling provided with longitudinal slots through which the tines 11 of a packer 10 can engage in the channel 9. The tines 11 are fastened to a two-armed lever 12, from which a pivot, driven and guided by a crank arm 13, circulates with a first frequency about an axis of rotation of the crank arm 13 while a link 14 acting on an end of the lever 12 facing away from the tines 11 is driven by a whole number fragment 1/n, for example, half or a third of the frequency of the arm 13. The interacting of arm 13 and link 14 results in that the tines 11 periodically pass through the collecting channel 9 (by n different routes) and in the process press and pre-compact crop material fed in by the cutting rotor 8 against a flank 15 of a press piston 17 guided in a press channel 16. At the n-th movement of the tines 11, the press piston 17, as shown in FIG. 1, is pulled back towards the front in the press channel so that the tines 11 push the harvest material into the press channel 16.

The press piston 17 is oscillatingly driven with the same frequency as the link 14 in order to press the newly fed-in harvest material against a bale 18 in the process of being created so that the same with each stroke of the press piston 17 grows a little more and is pushed towards the back in the press channel 16.

Above the press channel 16, a knotter assembly 21 with multiple knotters 20 distributed over the width of the press channel 16 is arranged. Each of these knotters 20 fixes the end of a length of twine which extends in each case through a slot on the top side of the press channel 16, past the back side of the bale 18 facing away from the piston 17 and through slots in the bottom side of the press channel to a Binding needle 19.

When the bale 18 has reached an intended size, the Binding needles 19, while between the press piston 17 and the bale 18 an intermediate space is open, are pivoted up through this intermediate space in order to feed the length of tine guided by the same in each case to one of the knotters 20, knotting the twine all round the finished bale 18.

Through the press movements of the piston 17, air also is displaced from the press channel 16, which escapes through the slots on the top and bottom sides of the press channel 16 and in the process flushes along harvest material particles. When these particles settle in excessive quantity on the knotters 20 their functionality is no longer ensured. In particular, it can occur that the twine is no longer clamped tightly enough and through the press movement of the piston 17 is ripped out of the knotter 20. When this occurs, the operation of the baler has to be interrupted and the unfinished bale 18 removed from the press channel 16 and the twine has to be re-threaded.

Figure 2:
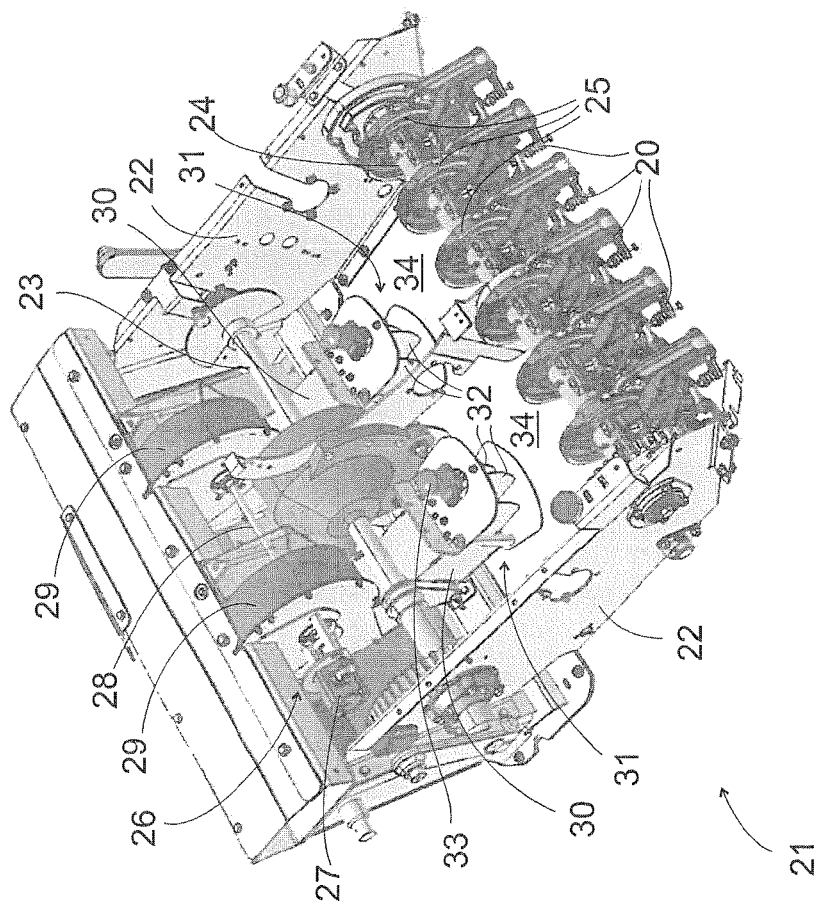
FIG. 2 presents a perspective view of a knotter assembly arranged on the press channel of the baler from FIG. 1.

FIG. 2 shows the knotter assembly 21 in a perspective view obliquely from the top. Between two side walls 22, which are orientated in travelling direction of the baler, two shafts 23, 24, which are coupled via a gearing. are rotatably mounted. The shaft 23 drives the movement of the link 14 (not shown in FIG. 2); the other shaft 24 carries a plurality of bevel gears 25, in this case 6 off, each of which drives one of the knotters 20.

A blower 26 in a front region of the knotter assembly 21 comprises an electric or hydraulic motor 27, which via a common shaft 28 drives centrifugal rotors in two cylindrical housings 29. From each of the housings 29, an air guide tube 30 extends to the back in the direction of the knotters 20. The air guide tubes 30 each pass through below the shaft 23 so that the air stream emitted by them sweeps closely over the top side of the press channel 16 (not shown in FIG. 2), where it prevents the settling of particles.

On an outlet opening of each blowing air channel 30, an arrangement of in this case three flaps 32, which are coupled and pivotable in the same direction are provided as flow guide element 31. In the representation of FIG. 2, the groups of flaps 32 are each pivot-driven by an electric motor 33; however, these could also be coupled to the rotation of the shaft 23 via a gearing.

The flaps 32 are separated from the knotters 20 by a free intermediate space 34, the width of which is selected corresponding to the pivot freedom of movement of the flaps 32 so that alternately three knotters 20 are subjected to the blowing air via each blowing air channel 30.

Figure 3:
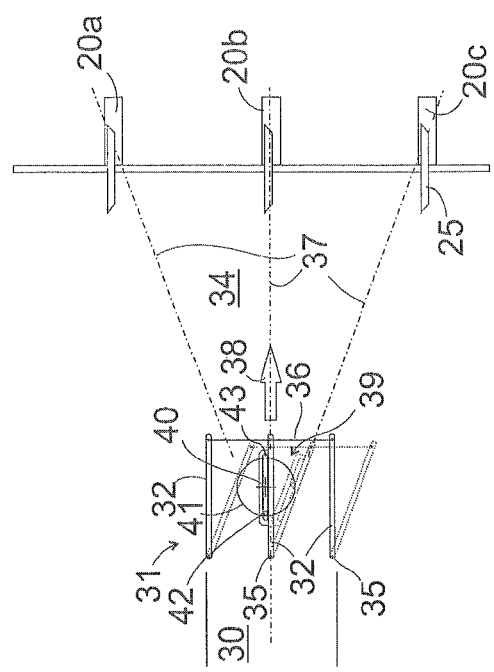
FIG. 3 presents a schematic top view of a part of the knotter assembly.

FIG. 3 shows a schematic top view of the flaps 32 at the end of one of the two blowing air channels 30 and three knotters located opposite these flaps 32, here for better distinction called knotter 20a, 20b, 20c. The flaps 32 are each pivotably mounted about a vertical axis 35 at their end facing the blowing air channel 30 and coupled to one another by a rod 36. In the position of the flaps 32 represented by continuous lines, a plane 37, which extends in the middle between the main sides of the middle flap 32, crosses the knotter 20b and the blowing air stream emitted by the blower 26, shown by an arrow 38, strikes the knotter 20b, while the flow velocity of the ventilation on the knotters 20a, 20c is low.

An eccentric 39 is formed by a rotationally driven wheel 41, driven by the electric motor 33 about an axle 40 and a pin 42, which offset against the axle 40 engages in a slotted link 43 on one of the flaps 32. A rotation of the wheel 41 by approximately 90° in clockwise direction moves the flaps into the position shown in dashed lines in FIG. 3, in which the plane 37 crosses the knotter 20c and the blowing air stream 38 is emitted in the direction of this knotter. A rotation of the wheel 41 by a further 90° returns the flaps 32 into the position drawn with continuous lines. Following further 90° rotations, they assume a position which is not separately shown in the figure which mirrors the position drawn in interrupted lines, in which the plane 37 runs through the knotter 20a.

Accordingly, during the course of each revolution of the wheel 41, the knotter 20b is subjected to the blowing air stream 38 twice, the knotters 20a, 20c however only once each. The cleaning efficiency is nevertheless comparable in all three knotters since the pivoting speed of the flaps 32, when the blowing air stream 38 is directed at the knotters 20a, 20c, at least at times becomes zero and the period of action of the blowing air stream on the knotters 20a, 20c is thus longer than on the knotter 20b.

During a forward movement of the press piston 17, air is sucked into the press channel 16 and the discharge of harvest material particles at the slots in the walls of the press channel 16 is negligible. Upon a reverse movement of the press piston 17, this air is again displaced and in the process carries harvest material particles through the slots to the outside. In order to prevent affording these particles the opportunity of settling on the knotters 20a to c, the flaps 32 should pass through their pivot angle range completely during a movement period of the piston, i.e. the period of the pivot movement of the flaps 32 should maximally be twice as long as the period of the piston movement. Preferentially, it is exactly as long as the period of the piston movement or even shorter so that the pivot angle range during a press movement of the piston 17 is passed through entirely.

The phases of the movements of flaps 32 and press piston 17 is matched to one another so that in the position of the press piston 17, in which the discharge of particles from the press channel 16 reaches its maximum, the blowing air stream 38 each is alternately directed onto the knotter 20a and the knotter 20c. When the period of the flap movement is twice as long as that of the piston movement, this is the case in periods of the piston movement each directly following one another. Accordingly, both knotters are similarly well protected from deposition of particles and the knotter 20b also is kept effectively clean since it is subjected to blowing air once in each period of the press piston movement.

Alternatively, it is possible to set the period of the plate movement at 4/3 or 4/5 of the period of the press piston movement so that the eccentric 39 in each period of the press piston movement performs 3/4 or 5/4 revolutions. Accordingly, it is ensured that in each period of the piston movement all knotters are subjected to blowing air at least once and it is possible to synchronise the movements of the piston and of the flaps so that at the time of maximal particle discharge all three knotters are alternately subjected to blowing air.

Other non-integer ratios between the periods of the piston movements and of the flap movements are likewise possible. It is substantial that the time span between the maximum of the particle discharge from the press channel and the exposure of a knotter to the blowing air stream 38 varies from one period of the piston movement to the next so that this waiting time, averaged over a multitude of piston movements is the same at least for the knotters 20a, 20c and none of these is systematically protected from particle depositions any poorer than the other.

REFERENCE NUMBERS

1 Baler
2 Pickup device
3 Harvest material
4 Collecting drum
5 Roller
6 Roller
7 Screw roller
8 Cutting rotor
9 Collecting channel
10 Packer
11 Tine
12 Lever
13 Crank arm
14 Link
15 Flank
16 Press channel
17 Press piston
18 Bale
19 Binding needle
20 Knotter
21 Knotter assembly
22 Side wall
23 Shaft
24 Shaft
25 Bevel gear
26 Blower
27 Motor
28 Shaft
29 Housing
30 Blowing air channel
31 Flow guide element
32 Flap
33 Electric motor
34 Intermediate space
35 Axle
36 Rod
37 Plane
38 Blowing air stream
39 Eccentric
40 Axle
41 Wheel
42 Pin
43 Slotted link As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A square baler, comprising:
   a press channel;
   a first knotter and a second knotter arranged on the press channel;
   a blower; and
   a plurality of flow guide elements;
   wherein each of the plurality of flow guide elements includes a plurality of pivotable flaps, the pivotable flaps are moveable between a first position, in which the respective flow guide element directs a blowing air stream of the blower onto the first knotter and away from the second knotter, and at least one second position, in which the respective flow guide element directs the blowing air stream past and away from the first knotter and onto the second knotter.

2. The square baler according to claim 1, wherein the plurality of flaps are assigned to the first and the second knotters, for directing the blowing air stream onto the first and the second knotters.

3. The square baler according to claim 2, wherein a first of the flow guide elements and a press piston of the press channel are periodically driven and wherein periods of the first flow guide element and of the press piston have a non-integer ratio.

4. The square baler according to claim 3, wherein with an identical position of the press piston in each case, the first flow guide element in different periods of the piston movement alternately assumes the first and the second position.

5. The square baler according to claim 4, wherein in each period of the press piston movement the first flow guide element covers a distance between first and second position at least once.

6. The square baler according to claim 4, wherein the first flow guide element comprises the plurality of pivotable flaps and wherein the plurality of pivotable flaps are coupled for pivotable movement in the same direction.

7. The square baler according to claim 1, wherein the plurality of pivotable flaps are arranged on an outlet of an air guide tube.

8. The square baler according to claim 1, wherein the plurality of pivotable flaps are separated from at least the first knotter by an intermediate space that is free of air-conducting installations.

9. The square baler according to claim 1, wherein at least one of the plurality pivotable flaps defines a plane, wherein in the first position, the plane crosses the first knotter and in the second position, the plane crosses the second knotter.

10. The square baler according to claim 1, wherein a pivoting speed of at least one of the plurality pivotable flaps in the first and second positions is lower than in an intermediate position.

11. The square baler according to claim 10, further comprising a third knotter which in the intermediate position is subjected to the blowing air stream.

12. The square baler according to claim 1, wherein a pivot movement of at least one of the plurality pivotable flaps is driven via an eccentric.

* * * * *